United States Patent
Pham

(10) Patent No.: US 8,379,809 B2
(45) Date of Patent: Feb. 19, 2013

(54) ONE-TOUCH USER VOICED MESSAGE

(75) Inventor: Kim-Oanh Pham, Marlboro, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2262 days.

(21) Appl. No.: 10/909,038

(22) Filed: Jul. 30, 2004

(65) Prior Publication Data

US 2006/0029197 A1 Feb. 9, 2006

(51) Int. Cl.
*H04M 1/64* (2006.01)

(52) U.S. Cl. .................................. 379/88.22; 379/88.04

(58) Field of Classification Search .... 379/88.01–88.04, 379/88.13, 214.01, 88.22, 88.17, 88.18; 715/255
See application file for complete search history.

(56) References Cited

U.S. PATENT DOCUMENTS

| | | | |
|---|---|---|---|
| 6,999,566 B1* | 2/2006 | Eason et al. | 379/88.22 |
| 2001/0028709 A1* | 10/2001 | Makela et al. | 379/214.01 |
| 2005/0207543 A1* | 9/2005 | Takeda et al. | 379/88.01 |

* cited by examiner

*Primary Examiner* — MD S Elahee
(74) *Attorney, Agent, or Firm* — Cozen O'Connor

(57) ABSTRACT

A communication terminal includes a first input device for receiving a voiced input, a second input device for receiving a user input command, and a processor for conducting communications through a communication network. The processor is connectable to a messaging system having a message memory. When a user inputs a create message signal at the second input device, the processor monitors the first input device for receipt of a user voiced message, and transmits the user voiced message to the messaging system for storage in the message memory. The message is accessible by the user from the messaging system using the communication terminal.

25 Claims, 9 Drawing Sheets

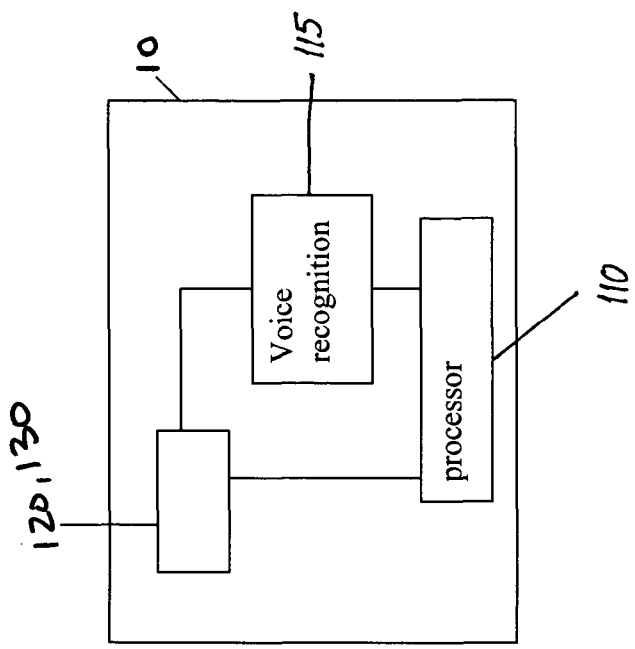
Fig. 2d
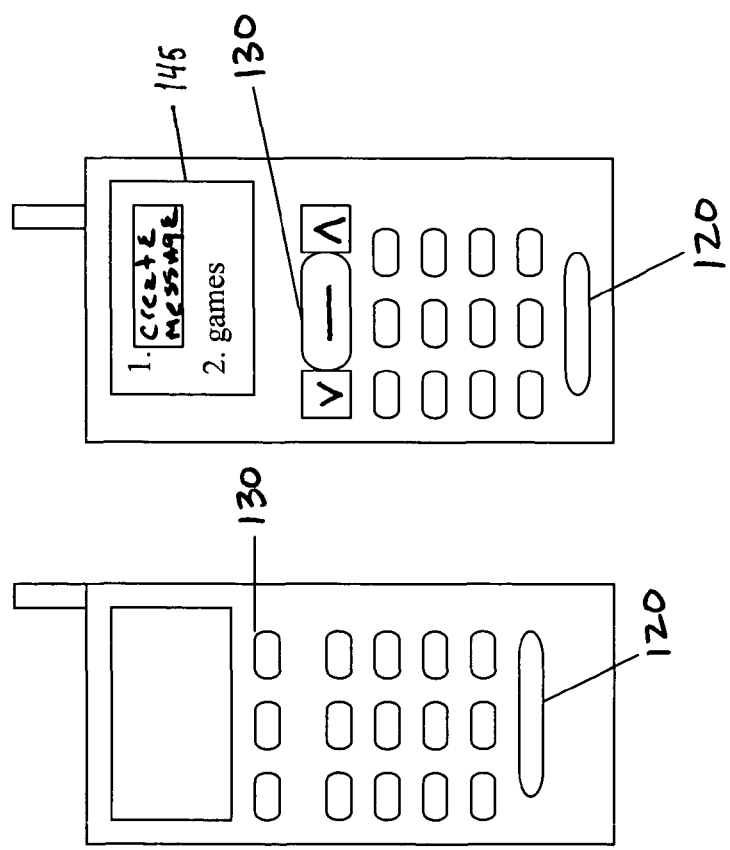
Fig. 2c
Fig. 2b

ONE-TOUCH USER VOICED MESSAGE

BACKGROUND OF THE INVENTION

1. Field of the Invention

The present invention relates to a communication application allowing a user of the communication terminal to create a user voiced message using the communication terminal of the user and to save the user voiced message in a messaging system accessible by the communication terminal.

2. Description of the Related Art

There are many way for creating personal notes or reminders such as, for example, creating conventional paper notes and leaving the notes in an appropriate location to serve as a reminder. Not only do these paper notes create clutter where they are left, the paper notes are only available at one location unless the user remembers to bring the note with him.

Computers (i.e., PCs, laptop, and notebook computers) allow users to leave electronic notes in various calendar, scheduling, and email programs. However, these types of programs require access to the computer for retrieving the messages. Although mobile computers such as laptop and notebook computers allow operation during travel, there are many instances where the user cannot access the information such as while walking and driving. Likewise, many mobile phones provide access to user e-mail and other message services. However, there are many instances which make it difficult, if not impossible, to generate and read e-mail messages or other text-based messages during travel, such as while a user is driving.

Recording devices are available which allow a user to record voiced messages onto a tape or into a digital memory. However, these devices are specifically designed for recording messages and thus constitute a further item that a user must remember to carry. If the user forgets this device, the user is prevented from recording messages and accessing the messages recorded thereon.

SUMMARY OF THE INVENTION

An object of the present invention is to provide a communication application allowing a user to create a voiced message and save the message to a messaging system accessible by the communication terminal.

It is a further object of the present invention to allow the user to access the voiced message and other messages in the messaging system using the communication terminal.

According to the present invention, a communication terminal includes a first input device for receiving a voiced input, a second input device for receiving a user input command, and a processor for conducting communications through a communication network. The processor is connectable to a messaging system having a message memory. When a user inputs a create message signal at the second input device, the processor monitors the first input device for receipt of a user voiced message, and transmits the user voiced message to the messaging system for storage in the message memory. The present invention allows a user to create and save a message by inputting one command and voicing the message. The message is saved in a location that is already used for storing messages.

In a first embodiment, the processor initiates communication with the messaging system when it is determined that a create message signal has been received at the second input device to indicate to the messaging system that the user voiced message is to be transmitted to the messaging system. The processor then receives the user voiced message and transmits the user voiced message to the messaging system.

In another embodiment, the processor is connected to a buffer memory within the communication terminal. In this embodiment, the user utters the user voiced message into the first input device directly after inputting the create message signal. The processor stores the user voiced message in the buffer memory on the communication terminal. The processor then initiates communications with the messaging system and transmits the user voiced message to the messaging system for storage in the message memory. This embodiment allows a user to immediately begin voicing the personal message after inputting the create message signal. Accordingly, a user can make and record a message with minimal effort without requiring that the user wait until the messaging system is ready to record, i.e., does not require a user to wait for communications to be established between the communication terminal and the messaging system.

The communication terminal may comprise a desk top phone, a computer, or a mobile terminal such as, for example, a mobile phone or a personal digital assistant (PDA).

The second input device may be a hard-wired button or key dedicated to generating the create message signal or a programmable button or key. The second input device may also comprise a microphone with a voice recognition unit allowing a user to voice the create message command. In this latter embodiment, the first input device may use the same microphone for receiving the user voiced message.

The messaging system may be a business messaging system. The messaging system may also comprise a unified messaging system. The messaging system may be incorporated in the communication terminal. Instead of voice messages, the messaging system may store text messages. In this case, the processor includes a text-to-speech module for transforming the user voiced message to a text message. Furthermore, the messaging system may be accessible by a communication terminal other than the communication terminal used to create the user voiced message. More specifically, the messaging system may be accessed by mobile terminals, desk top phones, or computers so that a user can access messages using any terminal that is convenient.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 2b is a schematic diagram showing input devices on a communication terminal according to the present invention;

FIG. 2c is a schematic diagram showing input devices on a communication terminal according to the present invention;

FIG. 2d is a schematic block diagram showing an input device in a communication terminal;

DETAILED DESCRIPTION OF THE PRESENTLY PREFERRED EMBODIMENTS

Figure 1:
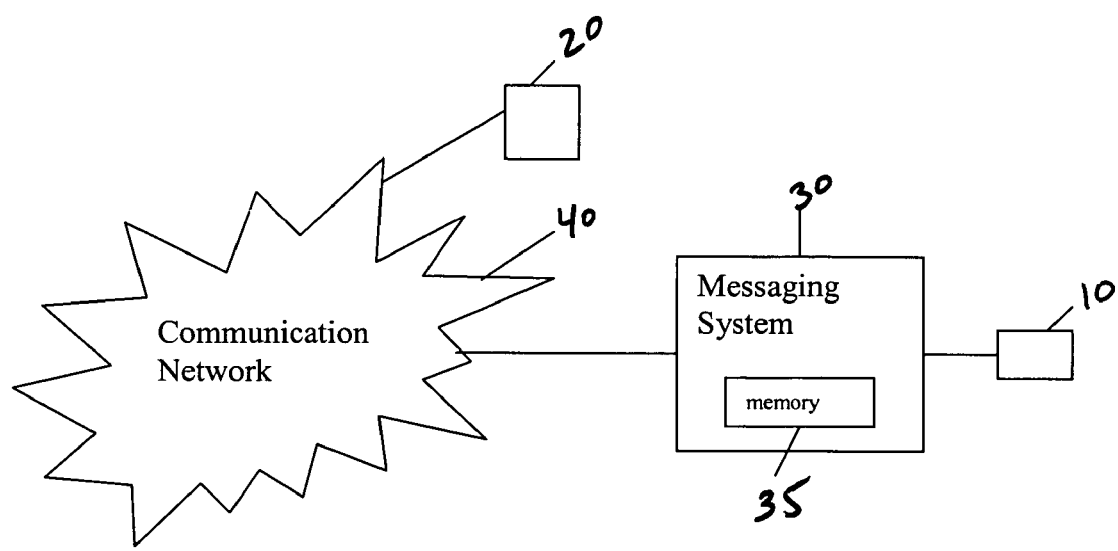
FIG. 1 is a schematic diagram showing an environment in which the present invention may be implemented.

FIG. 1 depicts an overview of a system in which the present invention operates. A communication terminal 10 is connected to a messaging system 30 which is connected to a communication network 40. The messaging system 30 includes a memory 35 for saving messages received, for example, from a second communication terminal 20 and intended for the user associated with communication terminal 10. As described in more detail below, the messaging system 30 may comprise an answering machine, a business messaging system, or a messaging system for a mobile phone connected to a mobile network. The communication terminal 10 accesses the messaging center to retrieve the messages using conventional means described in more detail below. The communication terminal 10 may comprise a mobile terminal, a desk-top telephone, or a computer.

Figure 2A:
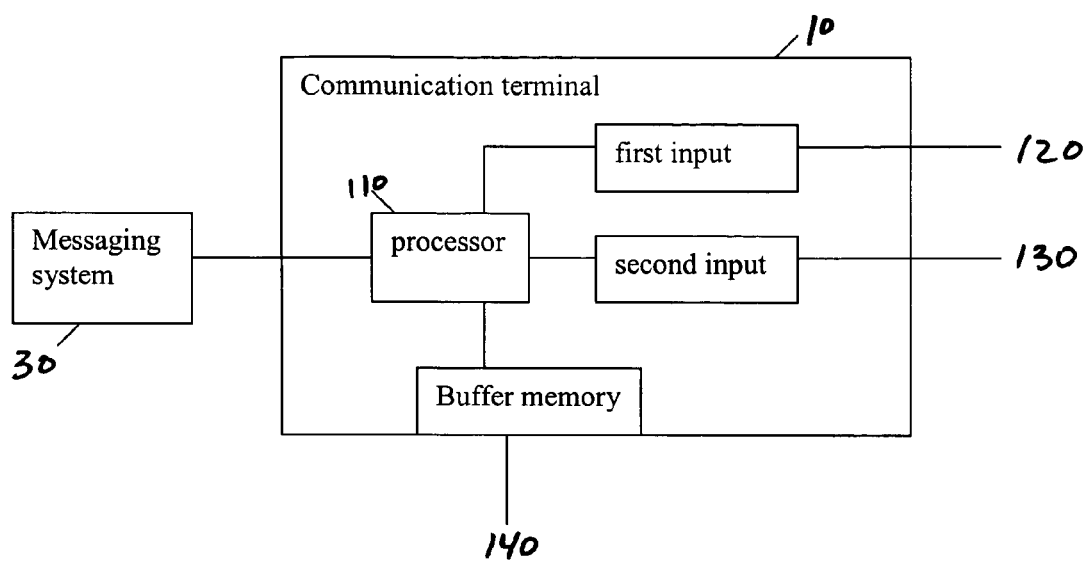
FIG. 2a is a schematic block diagram showing a communication terminal according to an embodiment of the present invention.

Referring to FIG. 2a the communication terminal 10 includes a processor 110, a first input device 120, and a second input device 130. The processor 110 may comprise a microprocessor running an operating program. The first input device 120 is a microphone and the second input device 130 comprises a plurality of keys or buttons. According to the present invention, the user of communication terminal 10 uses the second input device 130 to indicate that the user wishes to create a message to be saved in the memory 35 of the messaging system. In response, the processor receives the user voiced message from the first input device 120 and causes the user voiced message to be saved in the memory 35 of the messaging system 30. The user voiced message is saved in a list containing all other messages for the user received from other terminals, the messages being accessible by the user using the communication terminal 10. Alternatively, the user voiced message may be saved in the memory 35 separately from all other messages received from other terminals.

Accordingly, the present invention allows a user to create a message intended to be retrieved by the user at a later time by inputting one command to the second input 130 on the communication terminal 10. The present invention also saves the message in a location, i.e., memory 35, that is already used for storing messages intended for the user. Accordingly, when the user wishes to retrieve messages, the user is only required to look in one location for both messages received from others and personal messages which the user created. The user may use communication terminal 10 to retrieve the messages from the messaging system or another communication terminal (not shown). For example, if the communication terminal 10 is a desk top phone, the user may access the saved message using the desk top phone or a mobile phone.

FIG. 2b shows an embodiment of the communication terminal 10 in which the second input 130 comprises a button or key hardwired for the express purpose of creating a personal message. In this configuration, a user presses the button or key to activate the create message function in any operating mode of the communication terminal 10. Instead of comprising a hard-wired button or key, the second input 130 may comprise a programmable key or button (see FIG. 2c). For example, the second input 130 may comprise an "enter" button which activates the create message function when that function is highlighted on a display 145 of the communication terminal as shown in FIG. 2c. As an alternative or an addition to the embodiments of FIGS. 2b and 2c, the create message function may be activated by the first input device 120 by voice activation as shown in the embodiment of FIG. 2d. In this embodiment, a voice recognition circuit 115 recognizes when the user has voiced the command for creating a message and sends a signal implementing the function to the processor. Although FIGS. 2b and 2c show the communication terminal 10 as being a mobile phone, the communication terminal 10 in each of the embodiments of FIGS. 2b, 2c, and 2d may alternatively comprise a personal digital assistant (PDA), a desk-top phone, a computer or any communication terminal having the first and second inputs 120, 130 and the processor 110.

Figure 3A:
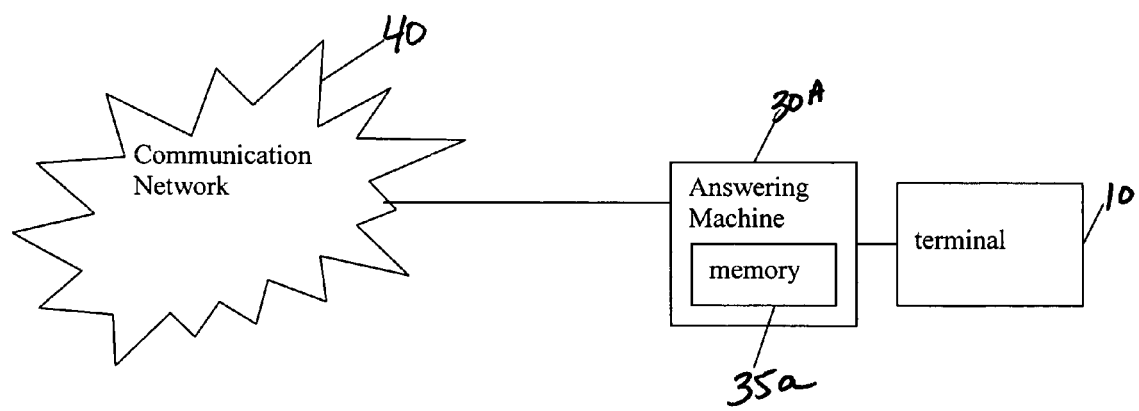
FIG. 3a is a schematic diagram showing one configuration of a messaging system.
Figure 3B:
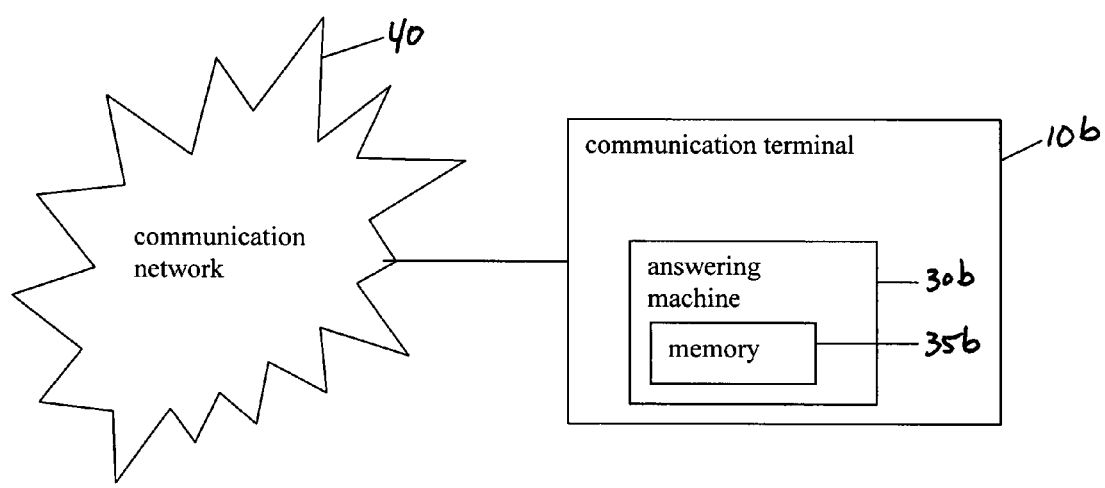
FIG. 3b is a schematic diagram showing another configuration of a messaging system.

FIG. 3a shows an embodiment in which the messaging system is in an answering machine 30a connected to the communication terminal 10. FIG. 3b shown an alternative embodiment in which the answering machine 30b is incorporated as a unit with the communication terminal 10.

Figure 4:
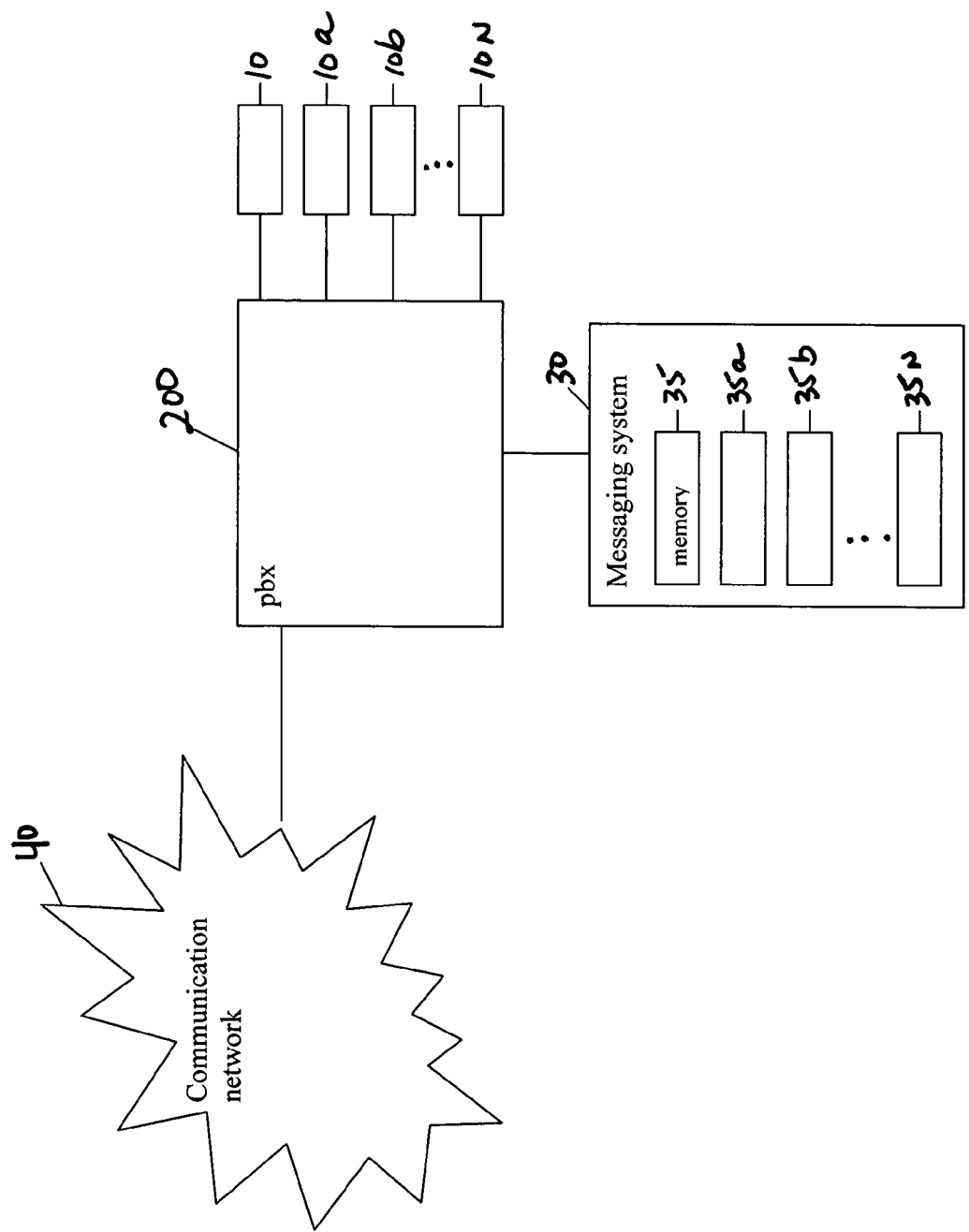
FIG. 4 is a schematic diagram showing a messaging system connected to a private branch exchange.

In the embodiment shown in FIG. 4, the first communication terminal 10 and the messaging system 30 are connected to a private branch exchange (pbx) 200. A plurality of communication terminals 10a, 10b, . . . 10n may be connected to the pbx 200, each associated with a different user and having a memory 35, 35a, 35b, . . . 35n for messages. In this embodiment, the messaging center 30 may comprise a business messaging system such as, for example, the Merlin Messaging System, the Partner Messaging System, and the IP Office Voice Mail System, each by Avaya Communications. Furthermore, the messaging system may comprise a unified messaging system integrating voice, e-mail, and other text messages. In the embodiment of FIG. 4, the communication terminals 10 may comprise desk phones in an office. Alternatively, the communication terminal 10 may be a mobile phone connectable to the pbx 200 by a wireless network.

Figure 5:
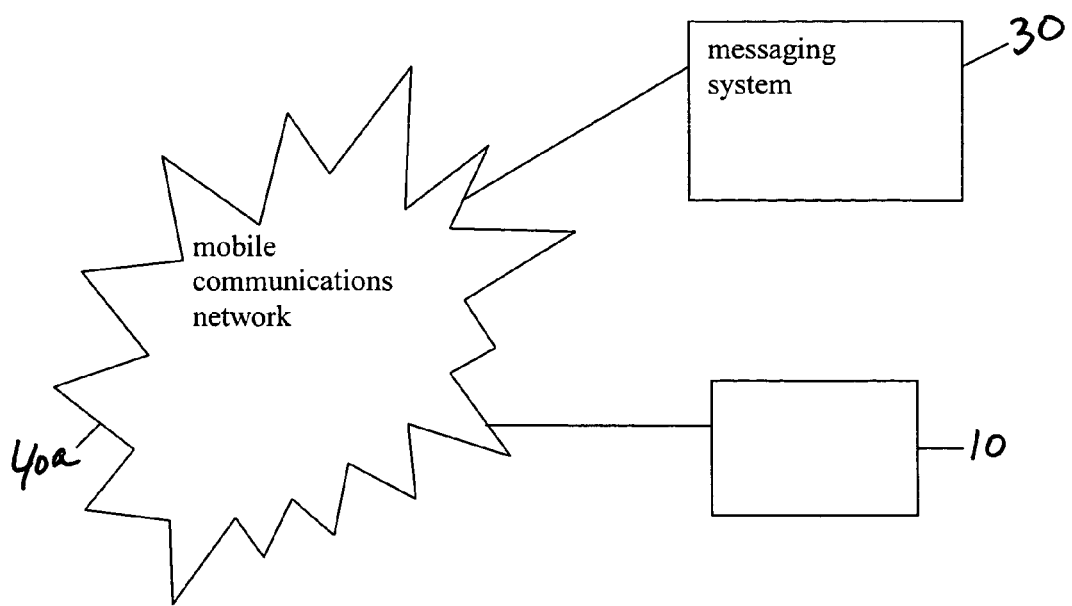
FIG. 5 is a schematic diagram showing a messaging system connected to a mobile communication network.

In yet a further embodiment shown in FIG. 5, the messaging system 30 is a messaging server connected to a mobile communication network 40a and the communication terminal 10 is a mobile terminal such as a mobile phone or a PDA connectable to the mobile communication network 40a.

Figure 6A:
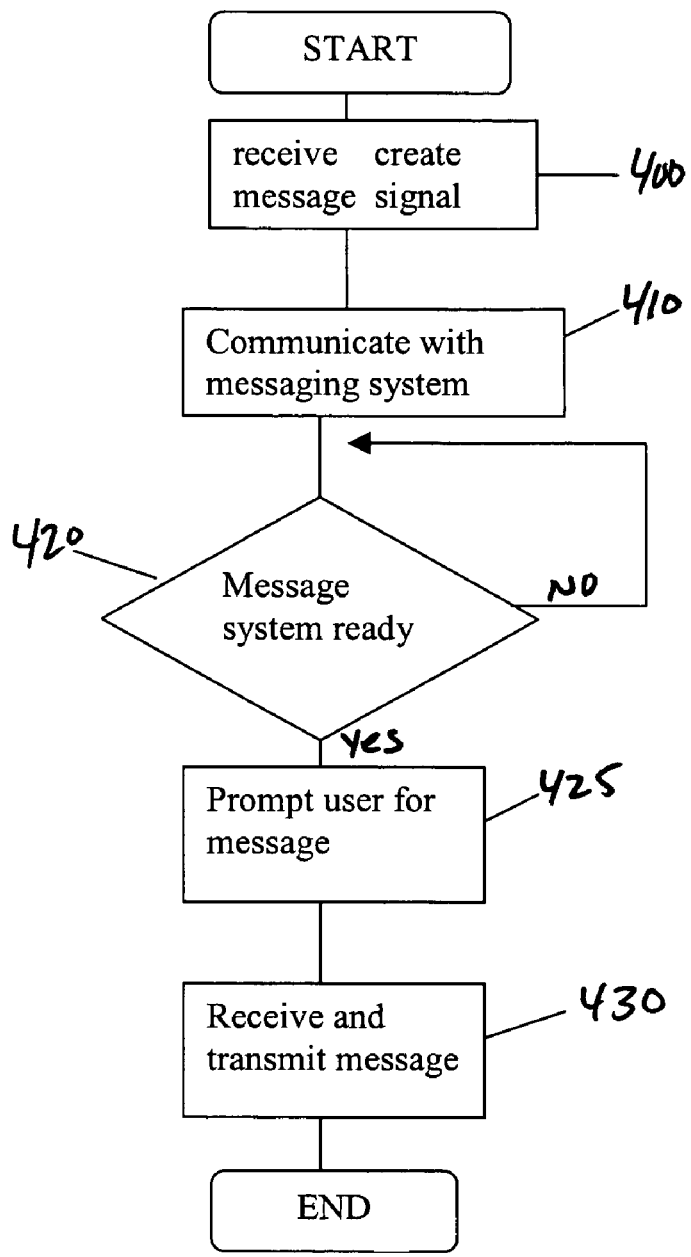
FIG. 6a is a flow diagram showing steps performed by a communication terminal according to an embodiment of the present invention.

In each of the embodiments in FIGS. 2a, 2b, 2c, 2d, 3a, 3b, 4, and 5 the processor 110 (see FIG. 2) of the communication terminal 10 performs the program steps shown in FIG. 6a. At step 400, the processor 110 receives a create message signal from the first or second input 120, 130. The processor 110 then communicates with the messaging system 30, 30a, 30b and causes the messaging system to prepare to record a message, step 410. The processor 110 of the communication terminal 10 waits until the messaging system 30, 30a, 30b is ready to record the message, step 420, then prompts the user for the voiced message, step 425. The processor 110 then transmits the user voiced message directly to the messaging system 30, 30a, 30b for recording, step 430.

Figure 6B:
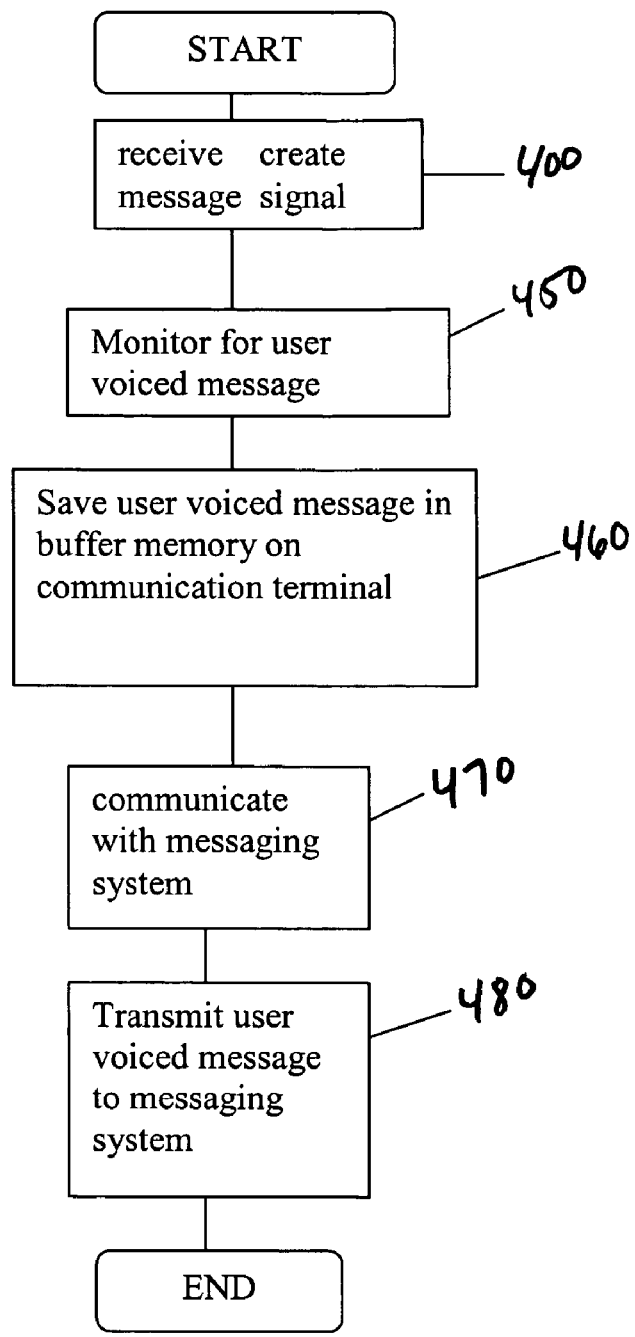
FIG. 6b is a flow diagram showing steps performed by a communication terminal according to another embodiment of the present invention.

In an alternative second embodiment shown in FIGS. 2a and 6b, the processor 110 receives the create message signal from the first or second input 120, 130 of the communication terminal 10, step 400. The processor 110 then immediately monitors the first input 120 for the user voiced message after receiving the create message signal step 450. The processor 110 saves the user voiced message in a memory 140 on the communication terminal 10, step 460. After saving the message in memory 140, the processor 110 then communicates with the messaging system 30, 30a, 30b, step 470, and transmits the user voiced message once the messaging system 30, 30a, 30b is ready to record the user voiced message, step 480. Step 480 may comprise recognizing, by the processor 110, the "beep" which answering machines normally produce when they are ready to record. If the messaging system 30 comprises a business messaging system, the processor 110 may perform a handshake routine to verify that the messaging system 30 is ready to receive the message.

This embodiment of FIG. 6b allows a user to initiate the create message function and immediately begin voicing the personal message. This embodiment allows a user to record a message with minimal effort and does not require that the user wait until the messaging system is ready to record, i.e., does not require a user to wait for communications to be established between the communication terminal and the messaging system.

Once the message is saved in the memory 35 of the messaging system 30, the user may access and organize the messages in memory 35 in accordance with conventional means for accessing and organizing the messages in the various messaging systems described above. As stated above, the messages may be saved as one group with all messages received from other terminals. Alternatively, the user voiced messages may be saved as a separate group of messages in the memory 35 so that once the user access the memory, the user can choose to access the user voiced messages.

Figure 7:
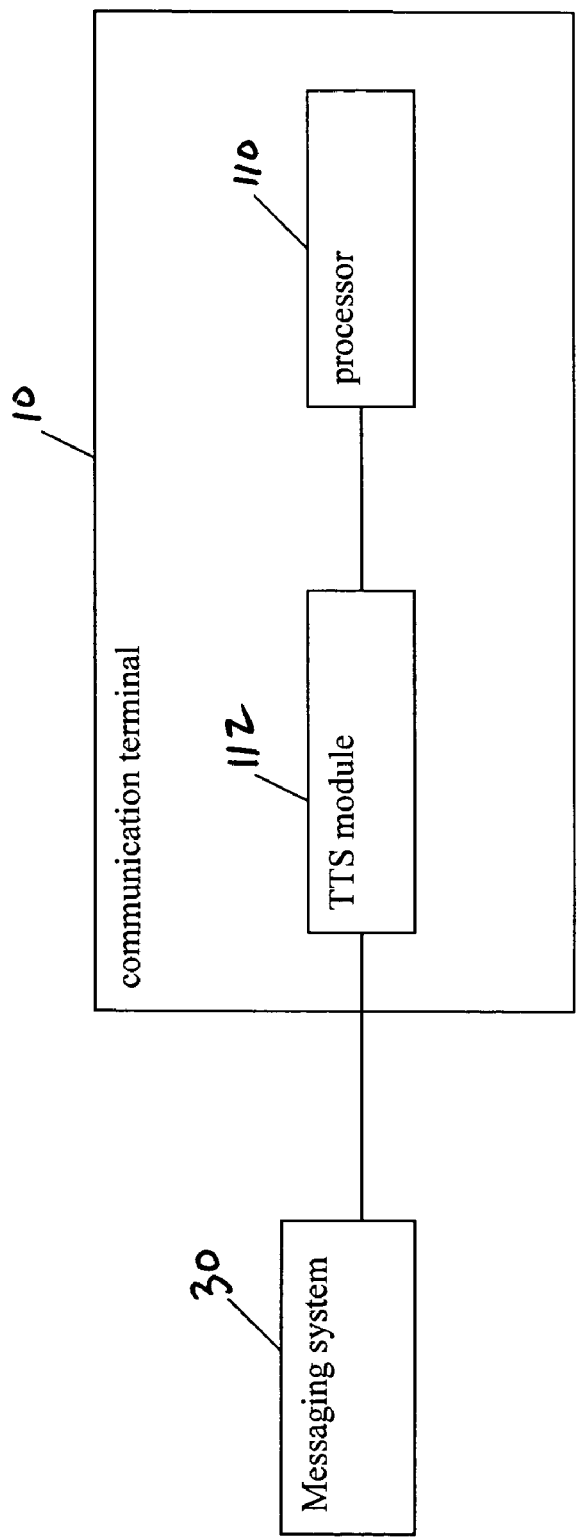
FIG. 7 is a schematic diagram of yet another embodiment of a communication terminal according to the present invention.

In each of the above-described embodiments, the messaging system is described as saving voice messages. However, the messaging center may alternatively comprise a device for saving text messages. In this embodiment, the processor 110 converts the user voiced message to text before sending the message to the messaging system 30 using a speech-to-text/text-to-speech (TTS) module 112, as shown in FIG. 7. The text message is then saved in the memory 35. When a user wishes to retrieve the message, the message may be retrieved and displayed to the user as a text message or the processor 110 may transform the text to a voiced message using the TTS module 112 so that the message is presented to the user in a speech format.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A telephone system, comprising:
a messaging system having a message memory for storing messages; and
a communication terminal of a user connectable to a communication network, the communication terminal comprising:
a first input device for receiving a voiced input;
a second input device for receiving a user input command;
a buffer memory;
a processor connected to the buffer memory, the processor being configured to conduct communications through the communication network with another terminal connected to the communication network, said processor being connected to said first input device and said second input device and connectable to the message memory of the messaging system for retrieving messages from the message memory, wherein said processor is further configured to monitor the first input for a user voiced message and transmit the received user voiced message to the memory for storage as a message in the message memory in response to receipt of a create message signal, without waiting for the messaging system to be ready to record the message, at said second input device, the processor storing the user voiced message in the buffer memory before transmitting the user voice message to the message memory of the messaging system such that the user is permitted to immediately record the message before communications between the communication terminal and the messaging system is established, wherein at least one of the communication terminal and the another terminal accesses the message in the message memory of the messaging system, and wherein said messaging system comprises an answering machine incorporated in said communication terminal.

2. The communication terminal of the system of claim 1, wherein said second input device is a hard-wired button on said communication terminal dedicated to generating the create message signal in response to user input of the create message signal.

3. The communication terminal of the system of claim 1, wherein said second input device is a programmable button.

4. The communication terminal of the system of claim 1, wherein said second input device comprises a microphone and a voice recognition unit.

5. The communication terminal of the system of claim 1, wherein the messaging system is a business messaging system.

6. The communication terminal of the system of claim 1, wherein the messaging system is a unified messaging system.

7. The communication terminal of the system of claim 1, wherein the messaging system with the message memory is incorporated in the communication terminal.

8. The communication terminal of the system of claim 7, wherein said message memory comprises a part of the answering machine for saving caller messages.

9. The communication terminal of the system of claim 1, wherein said processor comprises a non-transitory computer-readable storage medium storing computer-readable instructions for performing the steps of:
monitoring, by said processor, said second input device to determine whether the create message signal is received;
initiating, by said processor, communications with the messaging system to indicate to the messaging system that the user voiced message is to be transmitted to the messaging system when it is determined that the create message signal is received; and receiving, by said processor, the user voiced message from the first input device and transmitting, by said processor, the user voiced message to the messaging system.

10. The communication terminal of the system of claim 1, wherein said processor comprises a non-transitory computer-readable storage medium storing computer-readable instructions for performing the steps of:

monitoring, by said processor, said second input device to determine whether the create message signal is received;

monitoring, by said processor, said first input device for the user voiced message directly following determination that the create message signal is received;

storing, by the processor, the user voiced message in the buffer memory; and transmitting, by the processor, the user voiced message stored in the buffer memory to the messaging system for storage in the memory.

11. The communication terminal of the system of claim 10, wherein said non-transitory computer-readable storage medium further stores computer-readable instructions for performing the step of:

after said step of storing, initiating, by said processor, communications with the messaging system to indicate to the messaging system that the user voiced message is to be transmitted to the messaging system.

12. The communication terminal of the system of claim 1, wherein the messaging system stores text messages and said processor includes a speech-to-text/text-to-speech module for transforming the user voiced message to a text message before transmission of the message to the message system.

13. The communication terminal of the system of claim 1, wherein the messaging system is an e-mail system.

14. A method for storing a user voiced message in a message memory of a messaging system using a communication terminal including a first input device for receiving a voiced input, a second input device for receiving a user input command, a processor for conducting communications through a communication network with another terminal connected to the communication network, comprising the steps of:

determining, by the processor, when a create message command is input by a user at the second input device;

receiving, by the processor, the user voiced message from the first input device after determining that a create message command is received at the second input device;

storing, in a buffer memory, the user voiced message; and transmitting, by the processor, the user voiced message from the buffer memory to the messaging system and storing the user voiced message in the message memory without waiting for the messaging system to be ready to record the message;

wherein the processor stores the user voiced message in the buffer memory before transmitting the user voice message to the message memory of the messaging system such that the user is permitted to immediately record a message before communications between the communication terminal and the messaging system is established, wherein at least one of the communication terminal and the another terminal accesses the message in the message memory of the messaging system, and wherein an answering machine is incorporated in the communication terminal.

15. The method of claim 14, further comprising the step of initiating, by the processor, communications with the messaging system to indicate to the messaging system that the user voiced message is to be transmitted to the messaging system when it is determined that the create message signal is received and before said step of receiving.

16. The method of claim 14, wherein said method further comprises the steps of monitoring, by the processor, the first input device for the user voiced message directly following determination that the create message signal is received.

17. The method of claim 16, wherein the second input device is a hard-wired button on the communication terminal dedicated to generating the create message signal in response to user input of the create message signal.

18. The method of claim 16, wherein the second input device is a programmable button.

19. The method of claim 16, wherein the second input device comprises a microphone and a voice recognition unit.

20. The method of claim 16, wherein the messaging system is a business messaging system.

21. The method of claim 16, wherein the messaging system is a unified messaging system.

22. The method of claim 16, wherein the messaging system with the message memory is incorporated in the communication terminal.

23. The method of claim 22, wherein said message memory comprises a part of the answering machine for saving caller messages.

24. The method of claim 16, wherein the messaging system stores text messages and said processor includes a speech-to-text/text-to-speech module for transforming the user voiced message to a text message during said step of transmitting of the message to the message system.

25. The method of claim 16, wherein the messaging system is an e-mail system.

\* \* \* \* \*